US007282259B2

(12) United States Patent
Ku et al.

(10) Patent No.: US 7,282,259 B2
(45) Date of Patent: Oct. 16, 2007

(54) CERAMIC STRUCTURES AND METHODS OF MAKING THEM

(75) Inventors: Anthony Yu-Chung Ku, Rexford, NY (US); Sergio Paulo Martins Loureiro, Saratoga Springs, NY (US); Seth Thomas Taylor, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 345 days.

(21) Appl. No.: 10/983,277

(22) Filed: Nov. 8, 2004

(65) Prior Publication Data

US 2005/0266227 A1 Dec. 1, 2005

Related U.S. Application Data

(60) Provisional application No. 60/576,144, filed on May 28, 2004.

(51) Int. Cl.
*B32B 3/20* (2006.01)
*B32B 3/26* (2006.01)
*C04B 38/00* (2006.01)

(52) U.S. Cl. ............................... 428/307.7; 428/304.4; 428/312.6; 428/316.6

(58) Field of Classification Search ............ 428/304.4, 428/307.7, 316.6, 312.6
See application file for complete search history.

(56) References Cited

U.S. PATENT DOCUMENTS 4,966,919 A 10/1990 Williams, Jr. et al.
5,378,440 A * 1/1995 Herbst et al. ............... 423/210
5,583,277 A 12/1996 Kuehl
6,326,326 B1 12/2001 Feng et al.

(Continued)

FOREIGN PATENT DOCUMENTS

EP 1075867 9/1998

OTHER PUBLICATIONS

M.A. Cameron, et al., in "Atomic Layer Deposition of SiO.sub.2 and TiO.sub.2 in Alumina Tubular Membranes: Pore Reduction and Effect of Surface Species on Gas Transport," Langmuir 2000, 16, 7435 7444, American Chemical Society, Washington D.C.*

(Continued)

*Primary Examiner*—John J. Zimmerman
*Assistant Examiner*—Aaron Austin
(74) *Attorney, Agent, or Firm*—William E. Powell, III; Curtis B. Brueske (57) ABSTRACT

A ceramic structure having a scaffold with at least one opening and at least one porous filler material at least partially filling the at least one opening is described. The porous ceramic filler includes a plurality of pores. The pores have an average size in a range from about 2 nm to about 100 nm. The plurality of pores includes at least one pore architecture. For each pore architecture, the average pore size does not vary by more than about 100% when the average pore size is in a range from about 2 nm to about 50 nm, and the average pore size does not vary by more than about 50% when the average pore size is greater than about 50 nm. The plurality of pores includes at least two pore architectures when the porous filler material is silica. Also described is a method of making the ceramic structure.

17 Claims, 6 Drawing Sheets

U.S. PATENT DOCUMENTS 6,359,288 B1 3/2002 Ying et al.
6,592,764 B1 7/2003 Stucky et al.
2003/0205853 A1 11/2003 Yang et al.

OTHER PUBLICATIONS

P. Yang et al., "Generalized Synthesis of Large-pore Mesoporous Metal Oxides with Semicrystalline Frameworks", Nature, 396, 152-155 (1998).

P. Yang et al., "Block Copolymer Templating Synthesis of Mesoporous Metal Oxides with Large Ordering Lengths and Semicrystalline Framework", Chem. Mater., 11, 2813-2826 (1999).

A. Yamaguchi et al., "Self-assembly of a silica-surfactant nanocomposite in a porous alumina membrane", Nature Materials, vol. 3, 337-341, May 2004.

Novel Mesostructures in Anodized Alumina Nanopores and Applications in Large-area Mesoporous Functional Membrane, Y. Wu; G. Cheng; M. Moskovits1; G. Stucky1, San Francisco, CA (Apr. 2004).

* cited by examiner

Fig. 16 Ti map

Fig. 15 BF image

Fig. 18 Al map

Fig. 17 Si map

CERAMIC STRUCTURES AND METHODS OF MAKING THEM

CROSS-REFERENCE TO RELATED APPLICATIONS

This patent application is a non-provisional patent application claiming priority to U.S. provisional application 60/576,144 filed May 28, 2004.

BACKGROUND OF THE INVENTION

The invention relates to nanoceramics. Particularly, the invention relates to ceramic structures having porous ceramic fillers.

Ceramic structures with pores having a controlled size distribution are useful in various applications, such as filters for separations, water purification, or removal of heavy metals and biological contaminants. A variety of structures with pores having a controlled size distribution in the nanometer length scale are also used in other applications, such as catalytic hosts and sensor components. Specifically, pores in the nanometer size range are useful for separation processes and reactions involving biologically active molecules.

A filler material provides the characteristic porosity of a ceramic structure. Known filler materials having only a single composition, a single pore size range, and a single pore organization can be controllably produced. However, what is still needed is a ceramic structure with a porous filler material that has at least one of the following: controlled multiple compositions, multiple pore size ranges, or multiple pore organizations. Also still needed is a method of making such a ceramic structure with a porous filler material.

SUMMARY OF THE INVENTION

The present invention meets these and other needs by providing a ceramic structure and a method of making the same.

Accordingly, one aspect of the invention is to provide a ceramic structure. The ceramic structure includes: a scaffold comprising at least one opening; and at least one porous ceramic filler at least partially filling the at least one opening. The at least one porous ceramic filler includes a plurality of pores having at least one pore architecture. The pores have an average size in a range from about 2 nm to about 100 nm. For each pore architecture, the average pore size does not vary by more than about 100% when the average pore size is in a range from about 2 nm to about 50 nm, and the average pore size does not vary by more than about 50% when the average pore size is greater than about 50 nm. The plurality of pores has at least two pore architectures when the at least one porous ceramic filler is silica.

Another aspect of the invention is to provide a method of making a ceramic structure. The ceramic structure includes: a scaffold comprising at least one opening; and at least one porous ceramic filler at least partially filling the at least one opening. The at least one porous ceramic filler includes a plurality of pores having at least one pore architecture. The pores have an average size in a range from about 2 nm to about 100 nm. For each pore architecture, the average pore size does not vary by more than about 100% when the average pore size is in a range from about 2 nm to about 50 nm, and the average pore size does not vary by more than about 50% when the average pore size is greater than about 50 nm. The plurality of pores has at least two pore architectures when the at least one porous ceramic filler is silica. The method includes the steps of providing at least one liquid precursor of at least one porous ceramic filler in a solvent, wherein the at least one liquid precursor comprises at least one template, and at least one ceramic precursor; providing a scaffold to the at least one liquid precursor; removing a portion of the solvent from the at least one liquid precursor to form the at least one liquid precursor into a gel; removing the at least one template; and optionally heating the gel at a temperature in a range from about 200° C. to about 800° C.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Whenever a particular feature of the invention is said to comprise or consist of at least one of elements of a group and combinations thereof, it is understood that the feature may comprise or consist of any of the elements of the group, either individually or in combination with any of the other elements of that group.

Referring to the drawings in general, it will be understood that the illustrations are for the purpose of describing a particular embodiment of the invention and are not intended to limit the invention thereto.

Figures 1, 2, 3, 4:
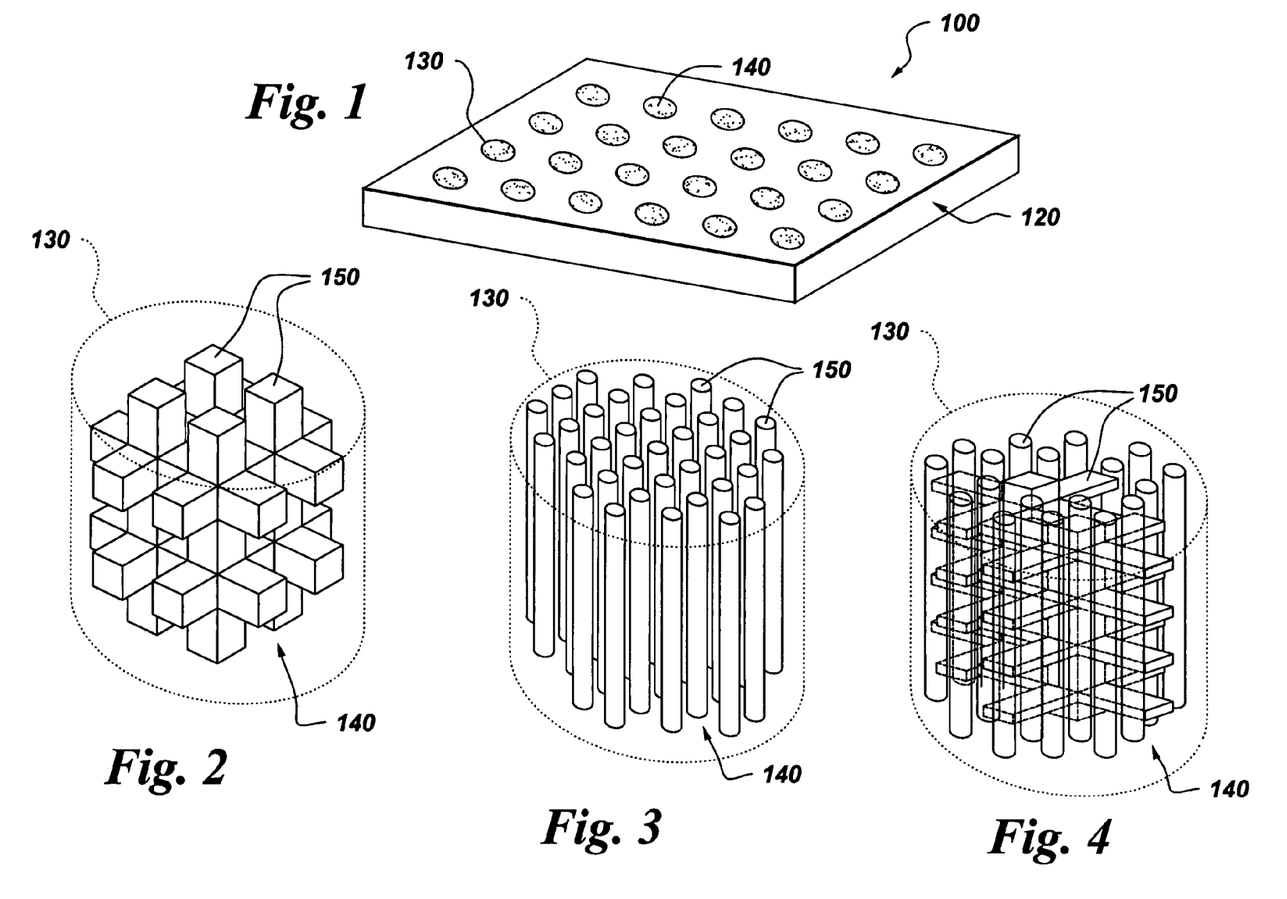
FIG. 1 is a schematic representation of a ceramic structure comprising a scaffold with at least one opening and a porous filler material.
FIG. 2 is a schematic representation of a porous filler material with a cubic organization.
FIG. 3 is a schematic representation of a porous filler material with a hexagonal organization.
FIG. 4 is a schematic representation of a porous filler material with a plurality of pore architectures with a cubic organization and a hexagonal organization.

FIG. 1 is a schematic representation of a ceramic structure 100. The ceramic structure 100 comprises a scaffold 120. The scaffold 120 comprises at least one opening 130 and at least one porous ceramic filler 140. The porous ceramic filler 140 at least partially fills the opening 130.

The ceramic structure 100 can be any type of structure, such as for example, a membrane, a film, and a multilayered ceramic body.

The scaffold 120 provides mechanical stability. An example of a scaffold includes anodic aluminum oxide (AAO) membrane with macroporous openings 130. The scaffold may be comprised of various other materials such as glass, silica microfiber filter, quartz, and compacted ceramic powders. The scaffold 120 may be of any shape and size, such as depth, width, length, or other dimension.

The scaffold 120 includes at least one opening 130. The number of openings 130 in a scaffold 120 may vary. Each opening 130 is independent of another opening 130. For example, each opening 130 may independently be filled with a porous filler material 140 independent of the porous filler material 140 that may fill another opening 130. Furthermore, the portion of an opening 130 filled with a porous filler material 140 is independent of the portion of another opening 130 filled with a porous filler material 140. FIG. 1 depicts the openings 30 as oval or circular for illustration only. Each opening 130 may be of varying dimensions, such as depth, width, length and shape.

The porous ceramic filler 140 comprises a plurality of pores, (also referred to herein as "pores"). The pores have an average size in a range from about 2 nm to about 100 nm. The pore size can be inferred from nitrogen adsorption measurements using a model for the adsorption process, such as for example, the Barrett-Joyner-Halenda (BJH) analysis. The term "nanoporous" as used herein means pores having a size in a range from about 1 nm to about 100 nm. Specifically, according to IUPAC, the pores are referred to as micropores when the pores are less than 2 nm. The pores are referred to as mesopores or mesoporous when the pores are in a size range from 2 nm to 50 nm. The pores are referred to as macropores or macroporous when the pores are in a size range greater than 50 nm.

The plurality of pores has at least one pore architecture 150. A pore architecture 150 means a plurality of pores having a size distribution (also referred as size range) and an organization. For each pore architecture, the average pore size distribution does not vary by more than about 100% when the average pore size is in a range from about 2 nm to about 50 nm (i.e. mesoporous). The average pore size distribution does not vary by more than about 50% when the average pore size is greater than about 50 nm (i.e. macroporous). The pores comprise at least two pore architectures 150 when the porous ceramic filler 140 is a single silica composition (i.e. only silica composition). Pore organization refers to the type of pore phase in the porous ceramic filler 140, and can assume periodic and non-periodic arrangements, as determined by diffraction (X-ray, neutron, synchrotron), microscopy (transmission electron, scanning electron), and spectroscopic (electron energy loss) techniques. Examples of pore organization include, but are not limited to, hexagonal organization, cubic organization, lamellar organization, bicontinuous organization, worm-like organization, ribbon organization, mesh organization, and gyroid organization.

A single pore architecture 150 is present when the pores comprise a single size range and a single organization. A plurality of pore architectures 150 is present when the pores have either a plurality of size ranges, a plurality of organizations, or both. In one example, a plurality of pore architectures 150 has a plurality of size ranges with a single organization, such as a first size range from 4 nm to 6 nm and a second size range, from 12 nm to 14 nm, with both having a hexagonal organization. In another example, a plurality of pore architectures 150 has a single size range with a plurality of organizations, such as a hexagonal organization and a cubic organization. In yet another example, a plurality of pore architectures 150 has a plurality of organizations with different size ranges, such as a size range from 4 nm to 6 nm with a hexagonal organization and a different size range from 12 nm to 14 nm with also a different pore organization, such as cubic.

FIG. 2 is a schematic representation of a porous filler material 140 with pores comprising a single pore architecture 150 having cubic organization and FIG. 3 is a schematic representation of a porous filler material 140 with pores comprising a single pore architecture 150 having a hexagonal organization. FIG. 4 is a schematic representation of a porous filler material 140 with pores comprising a plurality of pore architectures 150 having a plurality of organizations, here cubic and hexagonal organizations.

The porous filler material 140 comprises at least one composition. In one embodiment, the composition of the porous filler material 140 may either comprise at least one of an oxide, a borate, aluminate, silicate, a phosphate individually or in any combination thereof. In one embodiment, the porous filler material 140 comprises an oxide. Examples of oxides include, but are not limited to, $SiO_2$, $TiO_2$, $Al_2O_3$, $ZrO_2$, $Nb_2O_3$, $Ta_2O_5$, $WO_3$, $SnO_2$, $HfO_2$, $SiAlO_3$, $SiTiO_4$, $ZrTiO_4$, $Al_2TiO_5$, $ZrW_2O_8$, $CeO_2$, yttria stabilized zirconia, $Y_2O_3$, in their stoichiometric or non-stoichiometric forms, either individually or in any combination thereof. In a particular embodiment, the oxide comprises silica ($SiO_2$). In another particular embodiment, the oxide comprises titania. In one embodiment, the porous filler material 140 comprises a plurality of compositions. The plurality of compositions may comprise any combination of the oxides listed above. Furthermore, the composition may be doped with either at least one of an individual lanthanide element, a transition metal, or any combination thereof. Examples of such dopants include, but are not limited to, Ce, Pr, Nd, Eu, and Cr. Specific examples include europium nitrate and cerium chloride. Doping may induce optical emission within the porous filler material 140 by impurity activated luminescence. Impurity-activated luminescence occurs when a non-luminescent host material has been modified by inclusion of an activator species (i.e. a dopant) which is typically present in the host material in a relatively low concentration, such as from about 200 parts per million to 1 part per thousand. However, some materials require several mole or atomic percent of dopant ions for optimized optical properties. With an impurity-activated luminescent material, the activator ions may either absorb the incident photons directly, or the lattice may absorb the incident photons and transfer the absorbed photon energy to the dopant ions. In one embodiment, the porous ceramic filler 140 fills at least 50% of the opening 130. In another embodiment, a portion of an opening 130 is unfilled by the porous ceramic filler 140. The unfilled portion of the opening 130 may be filled with a plurality of nanoparticles each having a diameter that is less than the size of the opening 130.

The porous filler material 140 may further comprise a plurality of nanoparticles each having a diameter that is less than the size of the at least one opening 130. In one example, the plurality of nanoparticles comprises semiconductor nanocrystals. In another example, the plurality of nanoparticles comprises a ceramic material. The ceramic material may comprise at least one of an oxide, a borate, an aluminate, a silicate, a phosphate, or any combination thereof. Furthermore, the plurality of nanoparticles may either be embedded within the composition (i.e., the body of the composition) of the filler material, or within the plurality of pores of the filler material, or both.

Figure 5:
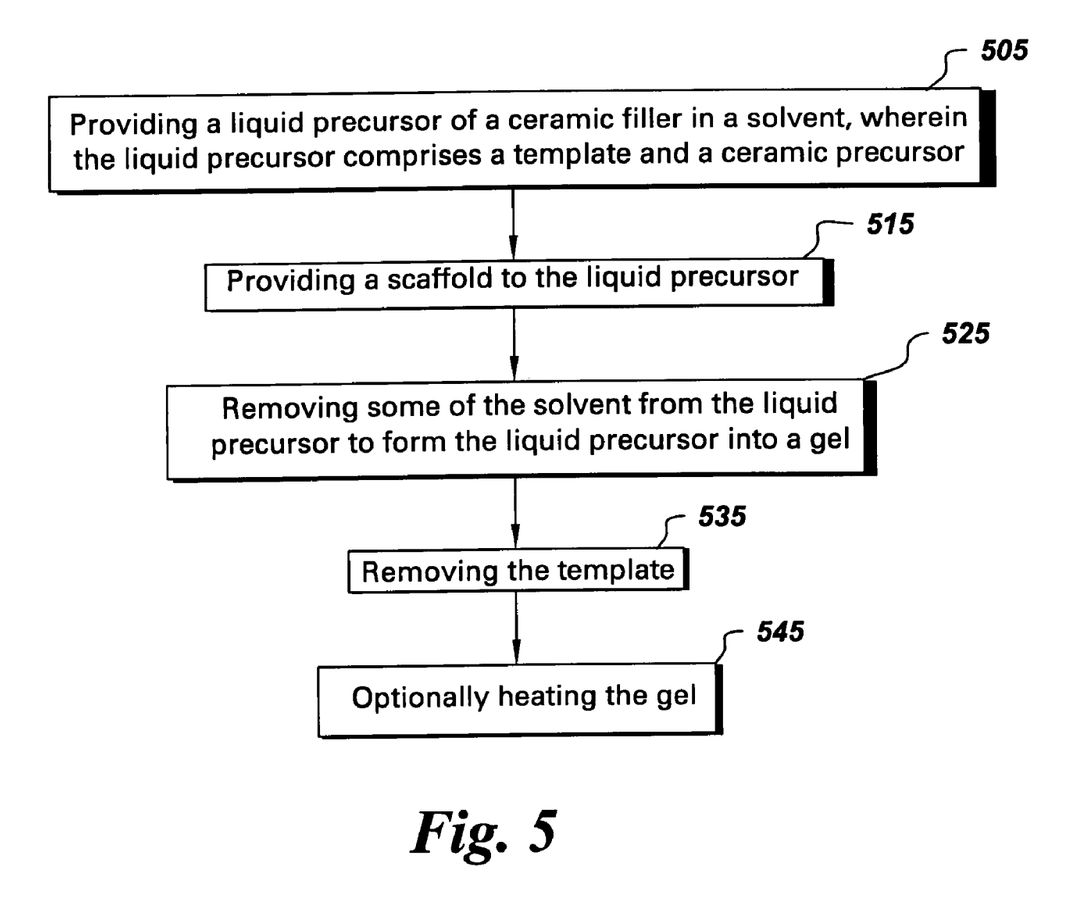
FIG. 5 is a flow chart of a method of making a ceramic structure.
Figure 6:
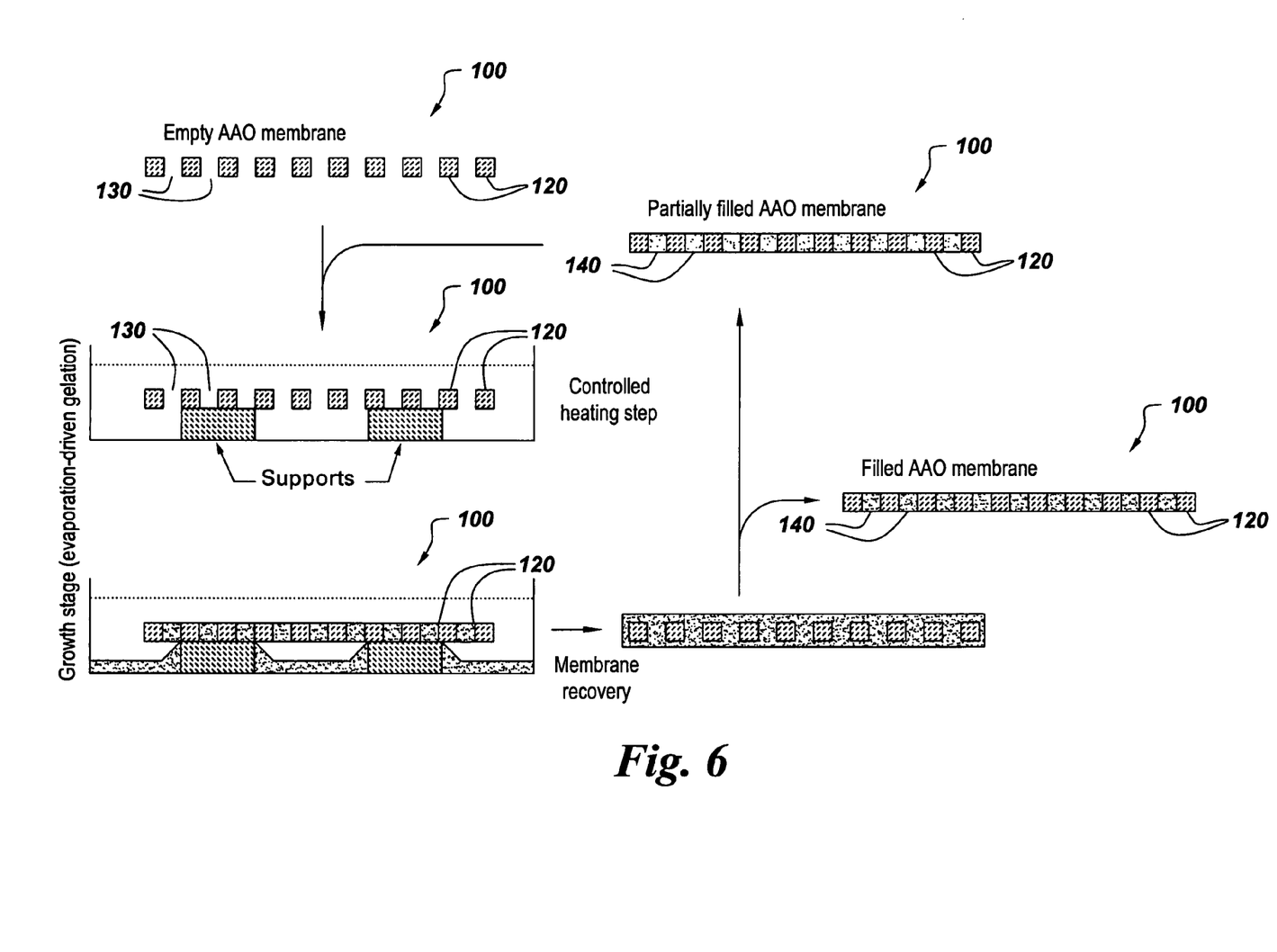
FIG. 6 is a schematic representation of a method of making a ceramic structure.

A second aspect of the invention is to provide a method of making the ceramic structure. FIG. 5 is a flow diagram of the method of making the ceramic structure and FIG. 6 is a schematic representation of the method. Referring to FIG. 5, Step 505 comprises providing at least one liquid precursor of at least one porous ceramic filler in a solvent. The solvent may either individually comprise water, methanol, propanol, butanol, or combinations thereof. The solvent mixture may include other less polar solvents to modify or adapt polarity such as acetic acid, formic acid, formamide, acetone, methylethylketone, ethylacetate, acetonitrile, N,N-dimethyl formamide, and dimethyl sulfoxide or any combination thereof. The liquid precursor is provided in an amount sufficient to fill a predetermined number of the openings 130 to a predetermined portion(s). The liquid precursor comprises at least one template and at least one ceramic precursor. The template provides the organization and size range of the pore architecture 150. Examples of the template include a cationic surfactant, a non-ionic block copolymer, a protein, an anionic surfactant, a nonionic surfactant, or any combinations thereof. Examples of the ceramic precursor include alkoxides, metal salts, oxide colloidal particles, or any combinations thereof. The liquid precursor may optionally comprise at least one reagent. Examples of a reagent include, but are not limited to, an acid, a base, and a salt, either individually or in any combination. Examples of an acid include, but are not limited to, hydrochloric acid, nitric acid, sulfuric acid, acetic acid, carbonic acid, and citric acid. Examples of a base include, but are not limited to, ammonium hydroxide, sodium hydroxide, and tetramethylammonium hydroxide. Examples of a salt include, but are not limited to, sodium chloride, potassium chloride, sodium acetate, sodium fluoride, and ethylenediaminetetraacetic acid tetrasodium. Furthermore, the liquid precursor may be doped with europium nitrate or cerium chloride.

By using different templates or ceramic precursors in each growth stage, adjacent regions with different pore size and or pore organization may be sequentially deposited. Furthermore, the method also provides independent control over the relative size and region of a pore architecture 150 through the order of filling and the extent of shrinkage during the heating step.

In Step 515, a scaffold 120 is provided to the liquid precursor. An example of the scaffold 120 is AAO, as described hereinabove. In Step 525, a portion of the solvent from the liquid precursor is removed to form the liquid precursor into a gel. As an example, the solvent may be removed by evaporation, using temperature-assisted or vacuum-assisted methods, or a combination of the two methods.

In Step 535, the template is removed. The template can be removed by heating in air to above 200° C. and, in the case of silica, rinsing with a solvent such as boiling ethanol, extracting using supercritical $CO_2$, or through photocatalytic degradation.

In Step 545, optionally, the gel is heated at a temperature in a range from about 200° C. to about 800° C. to form the ceramic structure 100.

The following examples serve to illustrate the features and advantages of the invention and are not intended to limit the invention thereto.

EXAMPLE 1

Example 1 is a ceramic structure 100 with one type of mesoporous filler material 140. The mesoporous filler material 140 comprises a titania composition with a single pore architecture 150. The single pore architecture 150 comprises a cubic organization.

A liquid precursor solution comprising a template and a ceramic precursor was prepared by combining a first solution and a second solution. The first solution was prepared by dissolving a template in ethanol at room temperature. In this embodiment, Pluronic P123 ($EO_{20}PO_{70}EO_{20}$) block copolymer was used as the template. A second solution was prepared in which the ceramic precursor titanium (IV) ethoxide (TEOT) was added to concentrated HCl and distilled water at room temperature. The second solution was stirred until clear. The second solution was added to the first solution to make the liquid precursor solution, and, after stirring for about 5 minutes, transferred to a Petri dish.

A scaffold 120 was immersed in the liquid precursor solution. In this embodiment, a macroporous anodic alumina (AAO) scaffold 120 containing 200 nm diameter openings 130 was used as the scaffold 120. The AAO scaffold 120 was placed horizontally on elastomer supports where the height of the supports was less than the initial depth of the liquid precursor solution. Some of the solvent from the liquid precursor solution was removed by evaporating in air until the remaining mass formed a continuous, transparent gel, after a period of 1 to 5 days. The gel was then heated at 400° C. for 4 hours in air and the template was removed.

Figure 7:
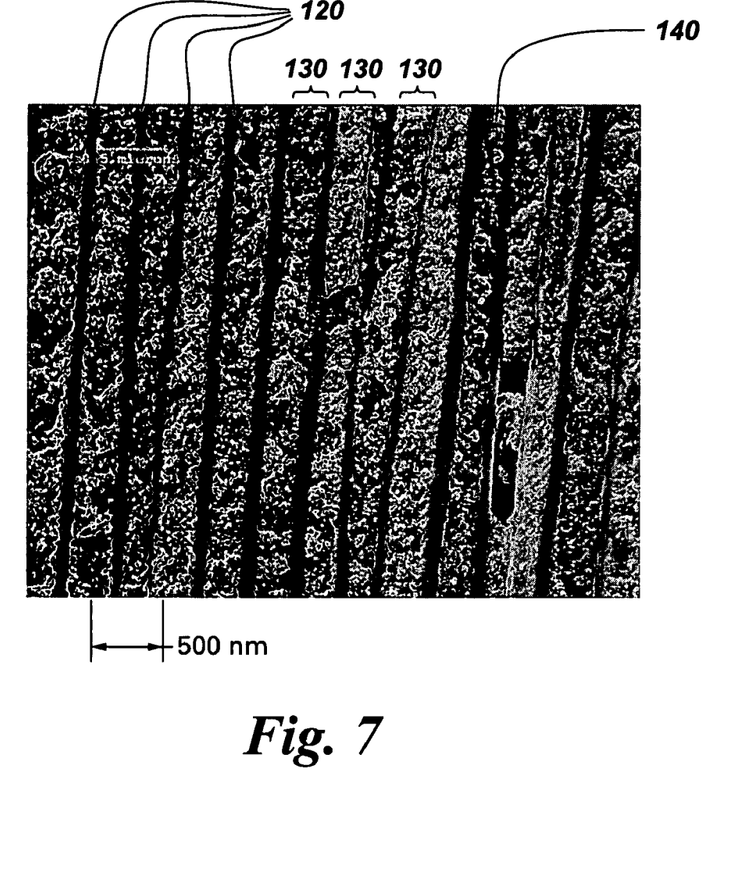
FIG. 7 is a high resolution scanning electron microscope (SEM) image of a cross sectional view of the openings of a ceramic structure filled with a mesoporous filler material comprising a single composition and a single pore architecture.
Figure 8:
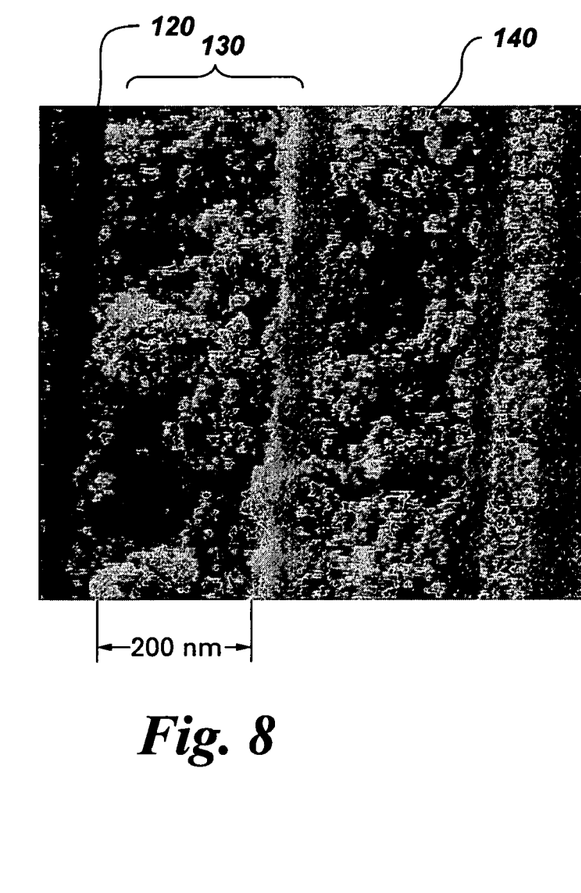
FIG. 8 is a SEM image of the same openings of the ceramic structure as that shown in FIG. 7 at a magnification of 100,000×.

FIG. 7 is a high-resolution scanning electron microscope image (SEM) of a cross sectional view of a plurality of openings 130 of a ceramic structure 100 filled with a mesoporous filler material 140. The mesoporous filler material 140 comprises a single composition of titania having a single pore architecture 150. The single pore architecture 150 has a cubic organization. The SEM is at a magnification of 2,500×. FIG. 8 is a SEM image of the same openings 130 of the ceramic structure 100 as that shown in FIG. 7 at a magnification of 100,000×.

EXAMPLE 2

Example 2 is a ceramic structure 100 with one type of mesoporous filler material 140. The mesoporous filler material 140 comprises a silica composition having a plurality of pore architectures 150.

A liquid precursor solution was prepared by dissolving a template in ethanol and acidified water (HCl, pH 0.4) at room temperature. In this embodiment, Pluronic P123 ($EO_{20}PO_{70}EO_{20}$) block copolymer was used as the template for the first growth cycle. After complete dissolution of the template, the ceramic precursor tetraethoxysilane (TEOS) was added to the liquid precursor solution under constant stirring, and the resulting solution transferred to a Petri dish after 5 minutes. A scaffold 120 was immersed in the liquid precursor solution. In this embodiment, an AAO scaffold 120 containing 200 nm diameter openings 130 was used as the scaffold 120. The AAO scaffold 120 was placed horizontally on elastomer supports where the height of the supports was less than the initial depth of the liquid precursor solution. Some of the solvent from the liquid precursor solution was removed by evaporating in air until the remaining mass formed a continuous, transparent gel, after a period of 1 to 5 days. The gel was heated at 600° C. for 4 hours in air to remove the template and shrink the silica deposit.

A second growth cycle involving Steps 505 through 535 was performed using a different template. In this example, Pluronic F127 ($EO_{106}PO_{70}EO_{106}$) block copolymer, or cetyltrimethylammonium chloride (CTAC), or Pluronic P123 ($EO_{20}PO_{70}EO_{20}$) block copolymer was used as the second template. The gel precursor solution was heated at 600° C. for 4 hours in air and the template was removed.

Figure 9:
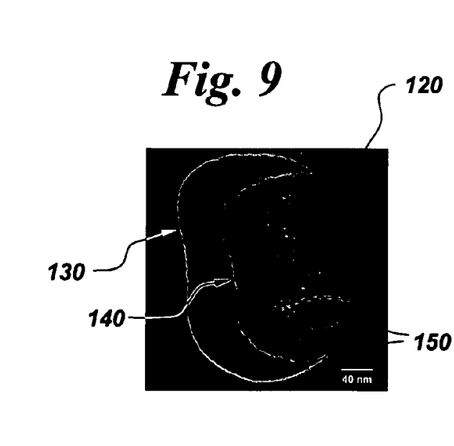
FIG. 9 is a transmission electron microscopic (TEM) image of the openings of a ceramic structure filled with a mesoporous filler material comprising a single composition with a plurality of pore architectures.

FIG. 9 is a TEM image of the openings 130 of a ceramic structure 100 filled with a mesoporous filler material 140 comprising a single composition having a plurality of pore architectures 150. The single composition is silica. The plurality of pore architectures 150 comprises two pore architectures 150. One pore architecture 150 has pores in a size range from about 5 nm to about 6 nm with a hexagonal organization. The other pore architecture 150 has pores in a different size range from about 1 nm to about 2 nm and also has a hexagonal organization. The pore architecture 150 with pores in a size range from about 5 nm to about 6 nm with a hexagonal organization was produced using Pluronic F127 as the template. The pore architecture 150 with pores in a size range from about 1 nm to about 2 nm and also having a hexagonal organization was produced using CTAC as the template.

Figure 10:
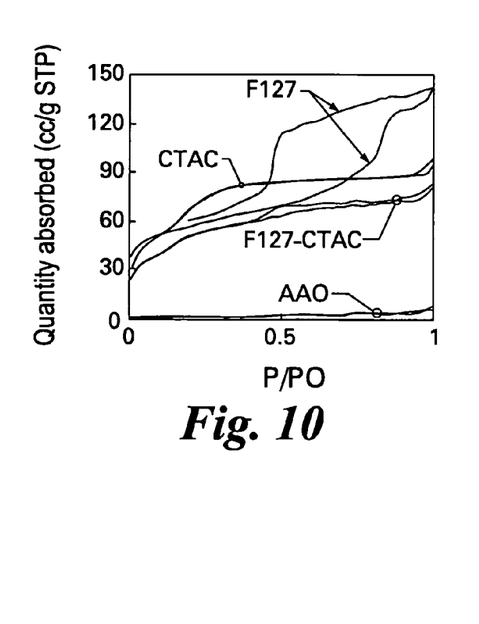
FIG. 10 is a nitrogen adsorption isotherm of the ceramic structure shown in FIG. 9.

FIG. 10 is a nitrogen adsorption isotherm of the ceramic structure 100 as that shown in FIG. 9. The nitrogen adsorption isotherm measurements confirm the type of porosity of the ceramic structure 100. The Brunauer Emmett Teller (BET) surface area for the ceramic structure shown in FIG. 9 was about 180 $m^2$/g. The Type-IV adsorption isotherm indicates that the porosity is mesoporous, with pore sizes generally between about 2 nm and about 50 nm.

Figure 11:
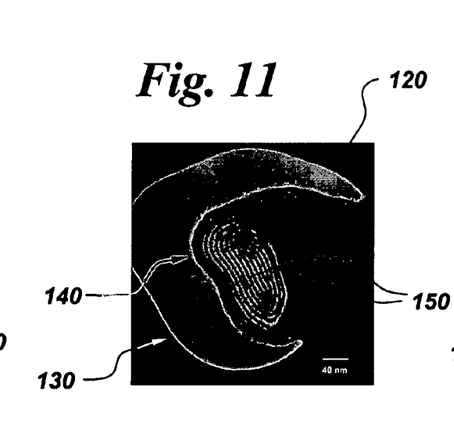
FIG. 11 is a TEM image of the openings of a ceramic structure filled with a mesoporous filler material comprising a single composition with a plurality of pore architectures.

FIG. 11 is a TEM image of the openings 130 of a ceramic structure 100 filled with a mesoporous filler material 140 comprising a single composition with a plurality of pore architectures 150. The single composition is silica. The plurality of pore architectures 150 comprises two pore architectures 150. One pore architecture 150 comprises pores in a size range from about 1 nm to about 2 nm with a hexagonal organization. The other pore architecture 150 comprises pores in a different size range from about 4 nm to about 5 nm, and also having a hexagonal organization. The pore architecture 150, comprising pores in a size range from about 1 nm to about 2 nm with a hexagonal organization, was produced using CTAC as the template. The pore architecture 150 comprising pores in a size range from about 4 nm to about 5 nm with a hexagonal organization was produced using P123 as the template.

Figure 12:
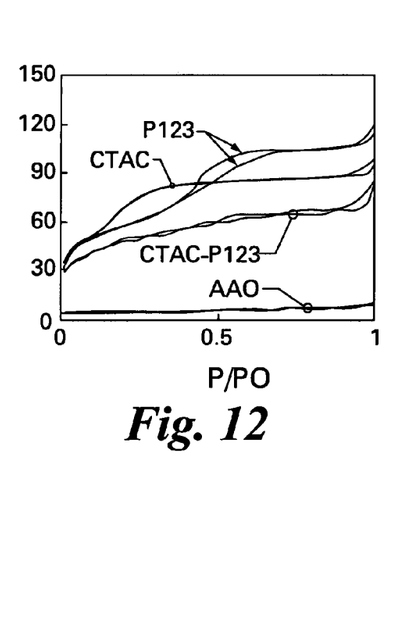
FIG. 12 is a nitrogen adsorption isotherm of the ceramic structure shown in FIG. 11.

FIG. 12 is a nitrogen adsorption isotherm of the same ceramic structure 100 as that shown in FIG. 11. The nitrogen adsorption isotherm measurements confirm the mesoporosity of the ceramic structure 100. The BET surface area for the ceramic structure shown in FIG. 11 was about 160 $m^2$/g.

Figure 13:
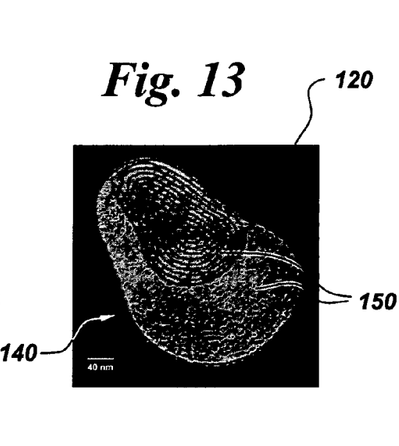
FIG. 13 is a TEM image of the openings of a ceramic structure filled with a mesoporous filler material comprising a single composition with a plurality of pore architectures.

FIG. 13 is a TEM image of the openings of a ceramic structure filled with a mesoporous filler material comprising a single composition and a plurality of pore architectures 150. The single composition is silica. The plurality of pore architectures 150 comprises two pore architectures 150. One pore architecture 150 has pores in a size range from about 4 nm to about 5 nm with a hexagonal organization. The other pore architecture 150 has pores with a different size range from about 11 nm to about 12 nm, and with a different organization: cubic. The pore architecture 150 with pores in a size range from about 4 nm to about 5 nm with a hexagonal organization was produced using Pluronic P123 as the template. The pore architecture 150 having pores in a size range from about 11 nm to about 12 nm with a cubic organization was produced using Pluronic F127 as the template.

Figure 14:
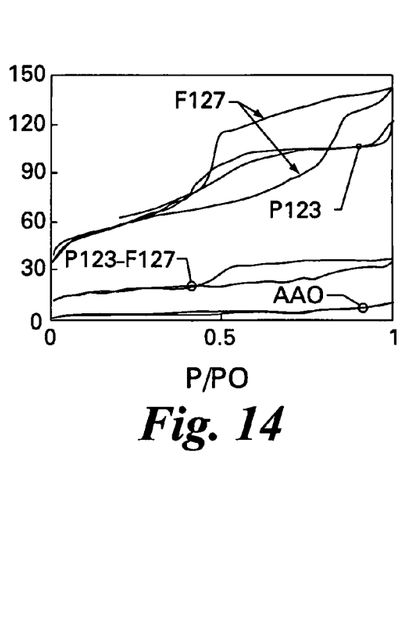
FIG. 14 is a nitrogen adsorption isotherm of the ceramic structure shown in FIG. 13.

FIG. 14 is a nitrogen adsorption isotherm of the ceramic structure 100 shown in FIG. 13. The nitrogen adsorption isotherm measurements confirm the mesoporosity of the ceramic structure 100. The BET surface area for the ceramic structure shown in FIG. 13 was about 50 $m^2$/g.

EXAMPLE 3

Example 3 is ceramic structure 100 with two types of mesoporous filler materials 140 and two types of pore architectures 150.

A liquid precursor solution was prepared by dissolving a template in ethanol in acidified water at room temperature. In this embodiment, Pluronic P123 ($EO_{20}PO_{70}EO_{20}$) block copolymer was used as the template for a first growth cycle. After complete dissolution of the template, tetraethoxysilane (TEOS) was added to the solution under constant stirring, and the resulting solution transferred to a Petri dish after 5 minutes. A scaffold 120 was immersed in the liquid precursor solution. In this Example, an AAO scaffold 120 containing 200 nm diameter openings 130 was used as the scaffold 120. The AAO scaffold 120 was placed horizontally on elastomer supports where the height of the supports was less than the initial depth of the liquid precursor solution. Some of the solvent from the liquid precursor solution was removed by evaporating in air until the remaining mass formed a continuous, transparent gel, after a period of 1 to 5 days. The gel was heated at 600° C. for 4 hours in air to remove the template and shrink the silica deposit.

A second growth cycle was performed in which a first solution was prepared by dissolving a template in ethanol at room temperature. In this embodiment, Pluronic P123 ($EO_{20}PO_{70}EO_{20}$) block copolymer was used as the template for the second growth cycle. A second solution was prepared in which titanium (IV) ethoxide (TEOT) was added to concentrated HCl and distilled water at room temperature. The solution was stirred until clear. The second solution was added to the first solution to form a liquid precursor solution and, after stirring for 5 minutes, transferred to a Petri dish. The macroporous anodic alumina (AAO) structure containing a silica deposit was immersed in the liquid precursor solution. The AAO scaffold 120 was placed horizontally on elastomer supports where the height of the supports was less than the initial depth of the liquid precursor solution. Some of the solvent from the liquid precursor solution was removed by evaporating in air until the remaining mass formed a continuous, transparent gel, after a period of 1 to 5 days. The gel was heated at 400° C. for 4 hours in air to remove the template.

Figures 15, 16, 17, 18:
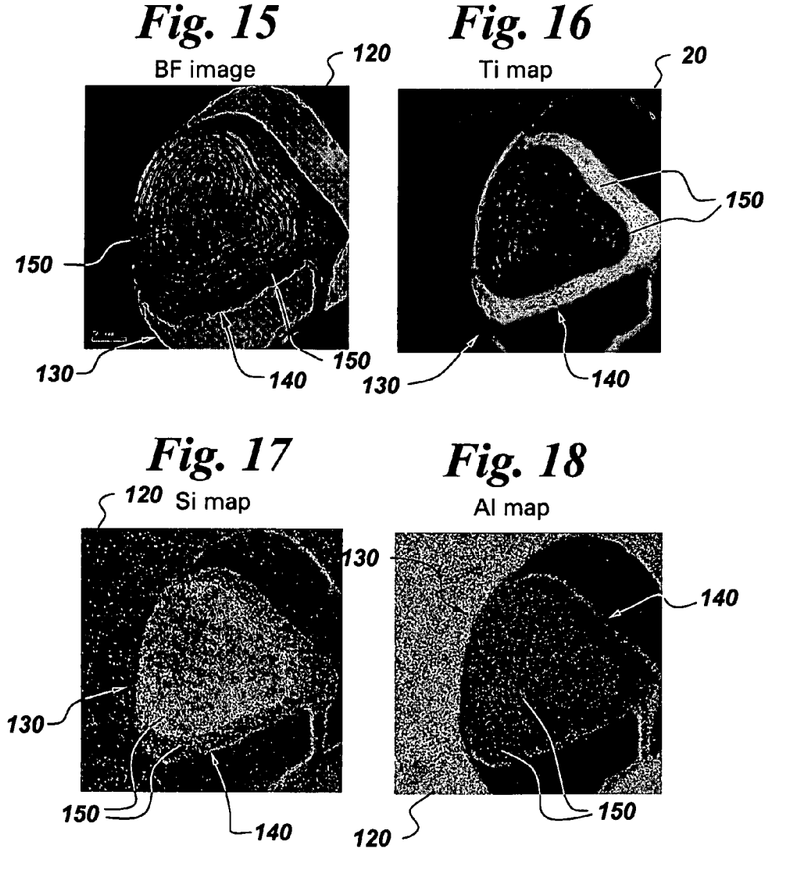
FIG. 15 is a TEM image of the openings of a ceramic structure filled with a mesoporous filler material comprising multiple compositions and a plurality of pore architectures.
FIG. 16 is an energy-filtered image of the ceramic structure shown in FIG. 15 showing a brightened titania composition.
FIG. 17 is an energy-filtered image of the ceramic structure shown in FIG. 15 showing a brightened silica composition.
FIG. 18 is an energy-filtered image of the ceramic structure shown in FIG. 15 showing a brightened alumina scaffold.

FIG. 15 is a TEM image of the openings 130 of a ceramic structure 100 filled with a mesoporous filler material 140. The mesoporous filler material 140 comprises a plurality of compositions and a plurality of pore architectures 150. The plurality of compositions comprises mesoporous silica and mesoporous titania. The plurality of pore architectures 150 has two pore architectures 150. One pore architecture 150 has pores with a hexagonal organization and a size range from about 3 nm to about 4 nm. The other pore architecture 150 has pores with a hexagonal organization, but with a size range from about 5 nm to about 6 nm. The scaffold 120 comprised alumina.

FIG. 16 is an energy-filtered TEM image of the ceramic structure 100 shown in FIG. 15. The titania mesoporous filler material 140 appears bright in this image recorded using the Ti L2,3 edge.

FIG. 17 is an energy-filtered TEM image of the ceramic structure 100 shown in FIG. 15. The silica mesoporous filler material 140 appears bright in this image recorded using the Si K edge.

FIG. 18 is an energy-filtered TEM image of the ceramic structure 100 shown in FIG. 15. The aluminum scaffold 120 appears bright in this image recorded using the Al K edge.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A ceramic structure comprising:
   (a) a scaffold comprising at least one opening; and
   (b) at least two porous ceramic fillers at least partially filling the at least one opening, wherein each of the at least two porous ceramic fillers comprises a plurality of pores having both a pore architecture and a wall composition, wherein either or both of the pore architectures and the wall compositions differ between two of the at least two porous ceramic fillers;
   wherein the pores have an average size in a range from about 2 nm to about 100 nm; and
   wherein for each pore architecture, the average pore size does not vary by more than about 100% when the average pore size is in a range from about 2 nm to about 50 nm, and the average pore size does not vary by more than about 50% when the average pore size is greater than about 50 nm.

2. The ceramic structure of claim 1, wherein each pore architecture comprises at least one pore organization, wherein the at least one pore organization comprises at least one of a hexagonal organization, a cubic organization, a lamellar organization, a bicontinuous organization, a worm-like organization, a ribbon organization, a mesh organization, a gyroid organization, and combinations thereof.

3. The ceramic structure of claim 1, wherein the scaffold comprises porous anodic alumina.

4. The ceramic structure of claim 1, wherein each pore architecture comprises at least one composition, wherein the at least one composition comprises at least one of an oxide, a borate, an aluminate, a silicate, a phosphate, and combinations thereof.

5. The ceramic structure of claim 4, wherein the at least one composition further comprises a dopant.

6. The ceramic structure of claim 4, wherein the at least one composition comprises an oxide.

7. The ceramic structure of claim 6, wherein the oxide comprises at least one of $SiO_2$, $TiO_2$, $Al_2O_3$, $ZrO_2$, $Nb_2O_3$, $Ta_2O_5WO_3$, $SnO_2$, $HfO_2$, $SiAlO_3$, $SiTiO_4$, $ZrTiO_4$, $Al_2TiO_5$, $ZrW_2O_8$, $CeO_2$, yttria stabilized zirconia, $Y_2O_3$, and combinations thereof.

8. The ceramic structure of claim 7, wherein the oxide comprises mesoporous silica.

9. The ceramic structure of claim 7, wherein the oxide comprises mesoporous titania.

10. The ceramic structure of claim 1, wherein the at least one porous ceramic filler further comprises a plurality of nanoparticles each having a diameter less than the size of the at least one opening.

11. The ceramic structure of claim 10, wherein the plurality of nanoparticles comprises semiconductor nanocrystals.

12. The ceramic structure of claim 10, wherein the plurality of nanoparticles comprises a ceramic.

13. The ceramic structure of claim 12, wherein the ceramic comprises at least one of an oxide, a borate, an aluminate, a silicate, a phosphate, and combinations thereof.

14. The ceramic structure of claim 10, wherein the plurality of nanoparticles is embedded within at least one of a composition of the at least one porous ceramic filler material, the plurality of pores of the at least one porous ceramic filler material, and combinations thereof.

15. The ceramic structure of claim 1, wherein the at least one porous ceramic filler fills at least 50% of the at least one opening.

16. The ceramic structure of claim 1, wherein a portion of the at least one opening is unfilled by the at least one porous ceramic filler.

17. The ceramic structure of claim 16, wherein the portion of the at least one opening that is unfilled by the at least one porous ceramic filler is filled by a plurality of nanoparticles, wherein each nanoparticle has a diameter that is less than the size of the at least one opening.

* * * * *